United States Patent Office 3,308,108
Patented Mar. 7, 1967

---

3,308,108
PROCESS FOR COPOLYMERIZING α-OLEFINS WITH TERTIARY N - ALKYLENE - ARYL-AMINES
Manfred Feldhoff, Oberseelbach, Albert Gustav Martin Gumboldt, Frankfurt am Main, and Jürgen Helberg, Kelkheim, Taunus, Germany, assignors, by mesne assignments, to Hercules Incorporated, Wilmington, Del., a corporation of Delaware
No Drawing. Filed Oct. 13, 1964, Ser. No. 403,643
Claims priority, application Germany, Oct. 19, 1963, F 41,038
6 Claims. (Cl. 260—88.1)

The present invention provides a process for copolymerizing α-olefines with tertiary N-alkylene arylamines.

It is known that α-olefines can be transformed into polymers and copolymers of high molecular weight under a low pressure and at a low temperature in the presence of organo-metal mixed catalysts which have been employed in the industry and are known as "Ziegler catalysts."

It is known that α-olefines can be copolymerized with compounds of the formula

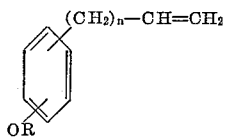

in which $n$ is 0 or a number within the range of 1 to 10 and R represents an unbranced or branched alkyl group (cf. U.S. Patent 3,070,577).

The present invention is based on the observation that copolymers having valuable properties can be prepared from α-olefines of the general formula $CH_2=CHR$, in which R represents a hydrogen atom or an alkyl-, aryl- or alkaryl group, in the presence of a catalyst system comprising $TiCl_4$ and $Al(C_2H_5)_3$, $Al(C_2H_5)_2Cl$ and/or $Al_2(C_2H_5)_3Cl_3$ by copolymerizing α-olefines according to the low pressure polymerization process with tertiary N-alkylene aryl amines of the general formula

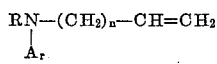

in which $n$ stands for a number within the range of 2 to 12, Ar represents an aromatic nucleus and R represents an alkyl group, an alicyclic ring or an aryl group in which the aromatic nuclei may be condensed or unsubstituted or may carry one or more substituents selected from the group consisting of alkyl-, cycloalkyl-, aryl-, alkoxy- and aryloxy groups, halogen atoms, dialkylamines and N-alkylene heterocyclic compounds in which the nitrogen atom is part of a heterocyclic ring which beside the said nitrogen atom contains only carbon atoms.

The observation on which the invention is based is surprising since it has been ascertained that corresponding α-alkylene alkyl amines, for example, dialkyl allyl amines and dialkyl butenyl amines, cannot be copolymerized with α-olefines since they strongly inhibit α-olefine polymerizations or even stop them completely, that is to say they damage or destroy the organo-metal catalyst system.

The process according to the invention is preferably applied for the copolymerization of α-olefines of the general formula $CH_2=CHR$, in which R represents a hydrogen atom or an alkyl-, aryl- or alkaryl group containing 2 to 15 carbon atoms, with the above-mentioned amines. As examples of such compounds ethylene, propylene, butene-1, 3-methyl-butene-1, pentene-1, 4-phenyl pentene-1, 4-phenyl butene-1, 5-phenyl pentene-1, hexene-1 and styrene may be mentioned.

As components with the α-olefines can be copolymerized there are preferably used N-methyl-N-butenyl aniline, N-methyl-N-pentenyl aniline, N-methyl-N-undecenyl aniline, N-ethyl-N-butenyl-p-di-methyl aminoaniline, N-methyl-N-butenyl α-naphthyl amine, N-methyl-N-pentenyl-α-naphthyl amine, N-methyl-N-undecenyl-α-naphthyl amine, N-butenyl diphenyl amine and similar tertiary N-alkylene aryl amines. N-alkylene heterocyclic compounds in which the nitrogen atom is part of a heterocyclic ring which beside the said nitrogen atom contains only carbon atoms, for example, N-allyl carbazole or N-butenyl indole, are also suitable for use in the process of the invention.

The copolymers prepared according to the process of the invention comprise 99 to 70, preferably 99 to 85, percent by weight of an α-olefine and 1 to 30, preferably 1 to 15, percent by weight of a tertiary N-α-alkylene aryl amine or an N-alkylene heterocyclic compound. The copolymers prepared according to the invention are distinguished by a high notched-bar impact strength and little tendency towards corrosion of stress cracks. They have an extraordinarily high resistance to degradation by ultraviolet light and to degradation by oxidation under the action of heat and can well be transformed in the thermoplastic stage.

The shaped articles prepared from the copolymers according to the invention, in particular the ribbons, fibres, filaments, films and sheets prepared from them by the melt spinning process, can be dyed dark tints with acid dyes, for example, Alizarinreinblau FFB. The dyeings so obtained are distinguished by a particularly good fastness to light and to washing.

The preparation of the copolymers according to the process of the invention may be brought about in the presence of the organo-metal mixed catalysts which are generally used in the low pressure polymerization of α-olefines. It is particularly advantageous to use catalyst systems comprising $TiCl_4$ and $Al(C_2H_5)_3$, $Al(C_2H_5)_2Cl$ and/or $Al_2(C_2H_5)_3Cl_3$. The catalyst system is prepared by mixing 0.1 to 20, preferably 2 to 4, parts of the organoaluminium compound in an inert solvent, for example, an aliphatic hydrocarbon, with 1 part of the $TiCl_4$ compound to be reduced. Alternatively, $TiCl_3$ which has previously been prepared from $TiCl_4$ by a reduction with hydrogen at an elevated temperature or with pulverulent aluminium may be used.

The catalyst mixtures which form immediately by the reaction of the aforesaid substances at a temperature within the range of −20° to +100° C., preferably at a temperature within the range of −10° to +40° C., can be used as such even without being purified. It is, however, advisable to wash them with an inert aliphatic hydrocarbon in order to remove undesired reaction products which might diminish their activity. The catalyst mixtures may also be subjected to an ageing process by being heated, for example, for 1 to 30 hours, to an elevated temperature, for example, a temperature within the range of 80° to 150° C. Both the preparation of the catalyst and the polymerization have to be carried out with the strict exclusion of atmospheric oxygen and moisture. This condition can be realized by carrying out all reactions under very pure dry nitrogen or under a noble gas. As solvents or dispersing agents may be used aliphatic, alicyclic or aromatic hydrocarbons, for example, n-heptane, n-hexane, cyclohexane, cyclopentane, toluene, chlorobenzene, anisole or well purified mineral oil fractions.

The reduced titanium compound is advantageously activated after the reduction with $Al(C_2H_5)_3$, $Al(C_2H_5)_2Cl$ or $Al(C_2H_5)_{1.5}Cl_{1.5}$. The concentration of the catalyst in the polymerization mixture is within the range of about 0.1 to 100, preferably 5 to 25, millimoles of $TiCl_3$ per litre.

The copolymerization of the α-olefines and the tertiary N-α-alkylene aryl amines or N-alkylene heterocyclic compounds is carried out as a block copolymerization or as an ordinary copolymerization in suspension by introducing the monomers once or several times, either separately and successively or together, into the dispersion of the polymerization catalyst in an aliphatic, alicyclic or aromatic hydrocarbon, for example, n-heptane, n-hexane, cyclohexane, cyclopentane, toluene, chlorobenzene, anisole or a well purified mineral oil fraction. The polymerization may also be carried out in the mixture of the monomers themselves in the absence of a solvent.

The polymerization is carried out at a temperature within the range of 30° to 150° C., preferably 40° to 80° C. It can be carried out under atmospheric pressure or a slightly superatmospheric pressure, preferably under a pressure of 1 atmosphere (gauge). The polymerization lasts in general 0.5 to 15 hours and preferably 2 to 8 hours before the desired degree of polymerization is obtained. The polymerization is terminated by the addition of an alcohol, for example, isopropanol or n-butanol, or a ketone, for example, acetone. After washing with water the polymer powder is filtered off, washed repeatedly with gasoline, methanol and acetone and dried. The dispersing agent may also be eliminated in usual manner by a steam distillation.

The copolymers which have been prepared by the process according to the invention can be transformed into shaped structures by the methods that are usually applied to olefine polymers.

The following examples serve to illustrate the invention but they are not intended to limit it thereto.

EXAMPLE 1

(a) *Preparation of the catalyst*

89.2 cc. (=400 millimoles) of ethyl aluminium sesquichloride and 28.2 cc. (=200 millimoles) of aluminium triethyl were dissolved in 300 cc. of a petroleum fraction which boiled between 180° and 200° C., which was free from water, oxygen, sulphur and olefines and which was scavenged with pure nitrogen. At 0° C., 109.6 cc. (=1000 millimoles) of titanium tetrachloride were added dropwise in the course of 30 minutes. The deep red dispersion which formed was stirred for 3 hours at 0° C. and then subjected to a heat treatment at 100° C. for 5 hours while stirring was continued. The precipitate which formed and which contained $TiCl_3$ was diluted with 300 cc. of the petroleum fraction mentioned above.

(b) *Copolymerization of N-methyl-N-undecenyl aniline with propylne (copolymerization in suspension)*

1.6 cc. of aluminium triethyl and 12.3 cc. (=15 millimoles of $TiCl_3$) of the catalyst described under (a) were introduced under nitrogen into 1.5 litres of a petroleum fraction boiling between 180° and 200° C. The mixture was heated to 50° C. while stirring. 13.0 grams (=50 millimoles) of N-methyl-N-undecenyl aniline were added to the dispersion and propylene dispersion and propylene was introduced into the batch at the same rate as it was consumed. The quantity of propylene was measured by means of a rotameter, 10 percent of it being allowed to escape as off-gas. The temperature in the polymerization vessel was kept at 50° C. by means of a water bath. After 3 hours polymerization was terminated by the addition of 50 cc. of n-butanol. The mixture was stirred for 30 minutes at 50° C. and washed five times with 500 cc. of oxygen-free water which had a temperature of 50° C. The fine colourless polymer powder was separated from the solution by filtration, washed three times with n-hexane, five times with both methanol and acetone and then dried at 70° C. in vacuo. 66 grams of a crystalline polymer powder having a melting point of 161 to 162° C. and a reduced specific viscosity of 5.08 (determined in a solution of 0.1 percent strength in decahydronaphthalene, at 135° C.) remained behind. The space-time yield amounted to 19.6 grams per litre and per hour, 75 percent of the product obtained being present as a crystalline modification. 22 grams of an amorphous polymer of the consistency of soft rubber could be isolated from the mother liquor by precipitation with five times the quantity of acetone.

Particulars concerning the polymerization and the properties of the copolymers obtained are indicated in Tables 1 and 2 given below.

EXAMPLE 2

(a) *Preparation of the catalyst*

490 cc. (=2.2 moles) of ethyl aluminium sesquichloride were dissolved in 1.5 litres of a petroleum fraction which had a boiling range of 180° to 200° C., which was free from water, oxygen, sulphur and olefines and which was scavenged with pure nitrogen. Into this solution a solution of 220 cc. (=2 moles) of titanium tetrachloride in 300 cc. of the petroleum fraction boiling between 180° and 200° C. was dropped in at 0° C. in the course of 3 hours. The resulting deep red dispersion was stirred for another 2 hours at 0° C. and heated for 5 hours at 110° C. while stirring was continued. After cooling to room temperature the $TiCl_3$ precipitate which had formed was allowed to deposit and the supernatant clear solution was siphoned off. The catalyst was washed about 10 times, while stirring, with the petroleum fraction mentioned above and every time the dispersing agent was removed by siphoning. The washing solution which was hydrolized with water finally contained 5 milliatoms of soluble chlorine per litre of catalyst dispersion, as was ascertained by titration.

(b) *Copolymerization of N-methyl-N-undecenyl aniline with propylene (copolymerization in suspension)*

4.7 cc. (=40 millimoles) of diethyl aluminum monochloride were introduced under nitrogen into 2 litres of the petroleum fraction mentioned above which had a melting range of 180° to 200° C. and which had been heated to 50° C. Then 17.0 grams (=65 millimoles) of N-methyl-N-undecenyl aniline and, after another 10 minutes, 24.4 cc. (=20 millimoles of $TiCl_3$) of the catalyst described in this example under (a) were added to the solution. Subsequently propylene was introduced for 5 hours at the same rate at which it was consumed, 10% of off-gas being allowed to escape.

The further treatment of the mixture was carried out in the manner described in Example 1(b). 163 grams of a crystalline polymer powder having a melting point of 159.5° C. and a reduced specific viscosity of 6.19 (determined in a solution of 0.1 percent strength in decahydronaphthalene, at 135° C.) were obtained. The space-time yield amounted to 19.4 grams per litre and per hour. 84 percent of the product obtained was present in the form of a crystalline modification. From the mother liquor, 31 grams of an amorphous polymer resembling soft rubber were obtained.

EXAMPLE 3

*Copolymerization of N-methyl-N-undecenyl aniline with propylene (block copolymerization)*

4.7 cc. (=40 millimoles) of diethyl aluminium monochloride were introduced under an atmosphere of $N_2$ into 2 litres of the petroleum fraction described above, which had a boiling range of 180° to 200° C. and which had been heated to 50° C. Then 24.4 cc. (=20 millimoles of $TiCl_3$) of the catalyst described in Example 2(a) were added. Propylene was introduced for 30 minutes at the same rate as it was consumed, 10 percent of off-gas being allowed to escape. The introduction of propylene was then stopped and nitrogen was introduced until all the propylene which had not been consumed was removed from the polymerization vessel, which took about 10 minutes. Then 13.0 grams (=50 millimoles) of N-methyl-N-undecenyl aniline were added under an atmosphere of nitrogen and kept for 1 hour under nitrogen. Then the introduction of nitrogen was stopped and for half an hour propylene was introduced again. Then the propylene was again expelled by means of nitrogen, 13.0 grams (=50 millimoles) of N-methyl-N-undecenyl aniline were added, the mixture was kept for 1 hour under nitrogen and polymerization was then carried through for another 2 hours while propylene was introduced in such an amount that about 10 percent of it escaped as off-gas. The mixture was further treated as described in Example 1(b). 112 grams of a crystalline polymer powder were obtained which had a melting point of 163.5° C. and a reduced specific viscosity of 4.15 (determined in a solution of 0.1 percent strength in decahydronaphthalene, at 135° C.). The space-time yield amounted to 13.4 grams per litre and per hour, 76.2 percent of the product obtained being present in the form of a crystalline modification. From the mother liquor 35.3 grams of amorphous oily polymers of low molecular weight could be obtained.

Further particulars concerning the polymerization and the properties of the copolymer are indicated in Tables 1 and 2 given below.

EXAMPLE 4

*Copolymerization of N-methyl-N-undecenyl aniline with ethylene*

4.7 cc. (=40 millimoles) of diethyl aluminium monochloride were introduced under nitrogen into 2 litres of the petroleum fraction mentioned above which had a boiling range of 180° to 200° C. and which had been heated to 50° C. To the resulting solution 13 grams (=50 millimoles) of N-methyl-N-undecenyl aniline and, after another 10 minutes, 24.4 cc. (=20 millimoles of $TiCl_3$) of the catalyst described in Example 2(a) were added. Then 15 litres per hour of ethylene and 10 litres per hour of nitrogen were introduced for 5 hours. The further treatment was carried out in the manner described in Example 1(b). 170 grams of a crystalline polymer powder having a melting point of 129.5° C. and a reduced specific viscosity of 7.07 (determined in a solution of 0.1 percent strength in decahydronaphthalene, at 135° C.) were obtained. The space-time yield amounted to 18.6 grams per litre and per hour. The product had a density ($\rho^{20}$) of 0.9542 grams per cc. The polymer contained 2.6 percent by weight of N-methyl-N-undecenyl aniline.

EXAMPLES 5 TO 12

*Copolymerization of other tertiary N-alkylene aryl amines and N-alkylene heterocyclic compounds with propylene*

The polymerization was carried out in the manner described in Example 2 and the further treatment of the mixture in the manner described in Example 1(b). Particulars concerning the polymerization and the properties of the polymers are indicated in Tables 1 and 2 given below.

EXAMPLE 13

*Copolymerization of N-methyl-N-undecenyl-α-naphthyl amine with propylene (copolymerization in suspension)*

4.7 cc. (=40 millimoles) of diethyl aluminium monochloride were introduced under nitrogen into 2 litres of absolute heptane and heated to 50° C. To the resulting solution 15.5 grams (=50 millimoles) of N-methyl-N-undecenyl-α-naphthyl amine and, after 10 minutes, 24.4 cc. (=20 millimoles of $TiCl_3$) of the catalyst described in Example 2(a) were added. Then propylene was introduced for 3 hours at the same rate as it was consumed, 10 percent of off-gas being allowed to escape.

The further treatment was carried out in the manner described in Example 1(b). 180 grams of a crystalline polymer powder having a melting point of 164° C., a density of 0.9025 grams/cc. and a reduced specific viscosity of 8.86 (determined in a solution of 0.1 percent strength in decahydronaphthalene, at 135° C.) were obtained. The space-time yield amounted to 33 grams per litre and per hour, 90.0 percent of the product obtained being present as a crystalline modification. 18 grams of amorphous oily polymers of low molecular weight could be isolated by distilling off the mother liquor. The polymer contained 1.45 percent by weight of N-methyl-N-undecenyl-α-naphthyl amine.

The product was subjected to a brittle test at 140° C. Whereas a test specimen of an unstabilized homopolymer of propylene was completely destroyed (complete local embrittlement) after 12 hours already, the aforesaid unstabilized copolymer had not yet undergone any alteration after 672 hours.

EXAMPLE 14

*Copolymerization of N-ethyl-N-butenyl aniline with propylene (copolymerization in suspension)*

4.7 cc.(=40 millimoles) of diethyl aluminium monochloride were introduced under nitrogen into 2 litres of absolute heptane and heated to 50° C. To the solution so obtained 17.5 grams (=100 millimoles) of N-ethyl-N-butenyl aniline and, after 10 minutes, 24.4 cc. (=20 millimoles of $TiCl_3$) of the catalyst described in Example 2(a) were added. Subsequently propylene was introduced for 5 hours at the same rate as it was consumed, 10 percent of off-gas being allowed to escape.

The further treatment of the mixture was carried out in the manner described in Example 1(b). 188 grams of a crystalline polymer powder having a melting point of 162° C., a density of 0.9018 grams per cc. and a reduced specific viscosity of 9.26 (determined in a solution of 0.1 percent strength in decahydronaphthalene, at 135° C.) were obtained. The space-time yield amounted to 20.2 grams per litre and per hour, 93.1 percent of the product obtained being present as a crystalline modification. 14 grams of amorphous oily polymers of low molecular weight could be isolated by distilling off the mother liquor. The polymer contained 1.67 percent by weight of N-ethyl-N-butenyl aniline.

TABLE 1.—COPOLYMERIZATION OF TERTIARY N-ALKYLENE ARYL AMINES OR N-ALKYL HETEROCYCLIC COMPOUNDS WITH PROPYLENE AT 50° C.

[Catalyst concentration: 10 millimoles of $TiCl_3$ per litre; batch: 2 litres]

| Example No. | No. of Example according to which the catalyst used was prepared | Kind of polymerization | Amount of propylene introduced | Kind of tertiary N-alkylene aryl amine or N-alkylene heterocyclic compound [1] | Millimoles | Period of polymerization in hours | Crystalline portion in grams | Crystalline portion in percent | Percent by weight of amine in crystalline polymer [2] |
|---|---|---|---|---|---|---|---|---|---|
| 1b | 1a | Ordinary copolymerization. | Excess (1.5 litres of solvent). | N-methyl-N-undecenyl aniline. | 50 | 3 | 66 | 75 | 4.8 |
| 2b | 2a | ...do... | Excess | ...do... | 65 | 5 | 163 | 84 | 3.9 |
| 3 | 2a | Block copolymerization (periodic copolymerization). | ...do... | ...do... | 100 | 5.5 | 112 | 76.2 | 2.8 |
| 5 | 2a | Ordinary copolymerization. | ...do... | N-methyl-N-butenyl aniline. | 50 | 5 | 95 | 94.0 | 1.2 |
| 6 | 2a | ...do... | Deficiency | N-methyl-N-undecenyl aniline. | 100 | 5 | 60 | 92.0 | 13.1 |
| 7 | 2a | ...do... | Excess | N-methyl-N-pentenyl aniline. | 50 | 5 | 122 | 90.3 | 3.4 |
| 8 | 2a | ...do... | ...do... | N-ethyl-N-butenyl dimethyl aminoaniline. | 50 | 5 | 57 | 83.1 | 1.8 |
| 9 | 2a | ...do... | ...do... | N-phenyl-N-butenyl-β-naphthyl amine. | 50 | 5 | 83 | 74.5 | 1.3 |
| 10 | 2a | ...do... | ...do... | N-methyl-N-pentenyl-α-naphthyl amine. | 50 | 5 | 77 | 93.1 | 1.7 |
| 11 | 2a | ...do... | ...do... | N-allyl-carbazole | 50 | 5 | 120 | 87 | 2.1 |
| 12 | 2a | ...do... | ...do... | N-butenyl indole | 50 | 5 | 72 | 93 | 1.8 |

[1] As far as the compounds had not been known they were examined by an elementary analysis and infra-red spectroscopy.
[2] The portion (in percent by weight) of the tertiary alkylene aryl amines or N-alkylene heterocyclic compounds contained in the copolymer was determined by means of an infra-red spectrograph. The products were reprecipitated three times from xylene and after each of these operations extracted with $CCl_4$ for 10 hours in a Soxhlet apparatus.

TABLE 2.—PROPERTIES OF THE COPOLYMERS OF TERTIARY N-ALKYLENE ARYL AMINE AND PROPYLENE AND N-ALKYLENE HETEROCYCLIC COMPOUNDS AND PROPYLENE OR OF TO HOMOPOLYMERS PREPARED ACCORDING TO EXAMPLES 1(b) AND 2(b).

| Example No. | 1b | 2b | 3 | 5 | 6 | 7 | 8 | 9 | 10 | 11 | 12 | Homopolymer prepared according to Example 1b | Homopolymer prepared according to Example 2b |
|---|---|---|---|---|---|---|---|---|---|---|---|---|---|
| Reduced viscosity | 6.83 | 6.19 | 4.15 | 7.56 | 7.30 | 5.98 | 6.45 | 9.57 | 7.20 | 5.63 | 8.51 | 12.20 | 5.76 |
| Crystallite melting point (° C.) | 159.5 | 159.5 | 163.5 | 165 | 164 | 164.5 | 158.5 | 162 | 160 | 160 | 165 | 165 | 162 |
| Density (g./cm.³) | 0.8950 | 0.9010 | 0.9070 | 0.9029 | 0.9037 | 0.9084 | 0.9003 | 0.9014 | 0.9015 | 0.9030 | 0.9100 | 0.9017 | 0.9127 |
| Notched bar impact strength (cm. kg./cm.²): | | | | | | | | | | | | | |
| +20° C | 19.35 | 16.51 | 11.48 | 17.47 | 13.62 | 14.82 | | | 18.37 | 8.54 | 9.72 | 7.00 | 7.43 |
| −20° C | 1.63 | 1.58 | 1.71 | 1.68 | 1.84 | 1.53 | | | 1.65 | 1.81 | 1.74 | 1.88 | 1.94 |

We claim:
1. A copolymer of propylene with a tertiary N-alkenyl aryl amine of the general formula

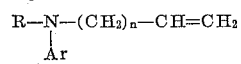

$$R-N-(CH_2)_n-CH=CH_2$$
$$\phantom{R-N-}|$$
$$\phantom{R-N-}Ar$$

in which $n$ is a number from 2 to 12, Ar represents aryl, and R represents alkyl or aryl, said copolymer being crystalline and comprising from 99 to 70 weight percent of propylene and from 1 to 30 weight percent of said amine, said copolymer having a crystalline melting point within the range of 158.5 to 165° C. and a molecular weight sufficiently high to be useful for the preparation of fibers and films by melt extrusion.

2. A copolymer as defined in claim 1 in which Ar represents naphthyl.

3. A copolymer as defined in claim 1 in which Ar represents phenyl.

4. A copolymer as defined in claim 1 in which R represents alkyl.

5. A copolymer as defined in claim 1 in which R represents aryl.

6. A copolymer of propylene with an amine of the group consisting of N-methyl-N-undecenyl aniline, N-methyl-N-butenyl aniline, N-methyl-N-pentenyl aniline, N-ethyl-N-butenyl dimethylaminoaniline, N-phenyl-N-butenyl-β-naphthyl amine, and N-methyl-N-pentenyl-α-naphthyl amine, said copolymer being crystalline and comprising from 99 to 70 weight percent of propylene and from 1 to 30 weight percent of said amine said copolymer having a crystalline melting point within the range of 158.5 to 165° C. and a molecular weight sufficiently high to be useful for the preparation of fibers and films by melt extrusion.

References Cited by the Examiner

UNITED STATES PATENTS

| | | | |
|---|---|---|---|
| 3,057,833 | 10/1962 | Devlin et al. | 260—88.1 |
| 3,092,563 | 6/1963 | Agins et al. | 260—875 |
| 3,100,764 | 8/1963 | Jezl et al. | 260—93.7 |
| 3,205,216 | 9/1965 | McManimie et al. | 260—88.1 |

OTHER REFERENCES

Natta: J. Pol. Sci., 34 (1959), pp. 531–549, 260–878.

JOSEPH L. SCHOFER, *Primary Examiner.*

H. WONG, *Assistant Examiner.*